United States Patent
Moore et al.

(10) Patent No.: US 11,491,706 B2
(45) Date of Patent: Nov. 8, 2022

(54) MATERIAL FOR 3D PRINTING AND A 3D PRINTED DEVICE

(71) Applicant: BAE SYSTEMS plc, London (GB)

(72) Inventors: Ian Anthony Moore, Chelmsford (GB); Daniel Benjamin Black, Chelmsford (GB); Mark Trevor Newman, Chelmsford (GB)

(73) Assignee: BAE SYSTEMS plc, London (GB)

( * ) Notice: Subject to any disclaimer, the term of this patent is extended or adjusted under 35 U.S.C. 154(b) by 423 days.

(21) Appl. No.: 16/647,677

(22) PCT Filed: Sep. 3, 2018

(86) PCT No.: PCT/GB2018/052484
§ 371 (c)(1),
(2) Date: Mar. 16, 2020

(87) PCT Pub. No.: WO2019/058096
PCT Pub. Date: Mar. 28, 2019

(65) Prior Publication Data
US 2020/0230873 A1  Jul. 23, 2020

(30) Foreign Application Priority Data

Sep. 20, 2017 (EP) ..................................... 17275146
Sep. 20, 2017 (GB) ..................................... 1715144

(51) Int. Cl.
*B29C 64/118* (2017.01)
*B29C 64/295* (2017.01)
(Continued)

(52) U.S. Cl.
CPC .......... *B29C 64/118* (2017.08); *B29C 64/209* (2017.08); *B29C 64/295* (2017.08);
(Continued)

(58) Field of Classification Search
CPC ... B29C 64/118; B29C 64/209; B29C 64/295; B33Y 70/00; B33Y 70/10; B33Y 10/00;
(Continued)

(56) References Cited

U.S. PATENT DOCUMENTS 6,476,774 B1   11/2002  Davidson et al.
2007/0218854 A1  9/2007  Lawrence et al.
(Continued)

FOREIGN PATENT DOCUMENTS

CN   105838036 A   8/2016
JP   2017024012 A   2/2017
(Continued)

OTHER PUBLICATIONS

International Search Report and Written Opinion Received for PCT Application PCT/GB2018/052484, dated Oct. 26, 2018. 16 pages.
(Continued)

*Primary Examiner* — Nahida Sultana
(74) *Attorney, Agent, or Firm* — Finch & Maloney PLLC

(57) ABSTRACT

A material for 3D printing is described. The material comprises a polymeric composition comprising a thermoplastic polymer; and from 50 to 99 wt. % ceramic particles comprising a metal, wherein at least 50% by weight of the particles have a diameter in a range from 10 to 100 μm; wherein the material has a dielectric strength of at least 5 kV/mm and/or a dielectric constant of at least 5.

20 Claims, 10 Drawing Sheets

(51) Int. Cl.
  B29C 64/209    (2017.01)
  C04B 35/626    (2006.01)
  C04B 35/634    (2006.01)
  H01G 4/005     (2006.01)
  B33Y 10/00     (2015.01)
  B33Y 70/10     (2020.01)

(52) U.S. Cl.
  CPC ........ *C04B 35/6262* (2013.01); *C04B 35/634* (2013.01); *H01G 4/005* (2013.01); *B33Y 10/00* (2014.12); *B33Y 70/10* (2020.01); *C04B 2235/5436* (2013.01); *C04B 2235/665* (2013.01); *C04B 2235/96* (2013.01)

(58) Field of Classification Search
  CPC . C04B 35/634; C04B 35/6262; C04B 35/653; H01G 4/18; H01G 4/206
  See application file for complete search history.

(56) References Cited

U.S. PATENT DOCUMENTS

| | | | |
|---|---|---|---|
| 2017/0028475 A1* | 2/2017 | Heikkila | B22F 10/00 |
| 2021/0154913 A1* | 5/2021 | Hikmet | B33Y 10/00 |
| 2021/0221061 A1* | 7/2021 | Smith | B29C 64/321 |
| 2022/0016837 A1* | 1/2022 | PeKarna | B33Y 30/00 |

FOREIGN PATENT DOCUMENTS

| | | | |
|---|---|---|---|
| WO | 2008116544 A1 | 10/2008 | |
| WO | 2017106545 A1 | 6/2017 | |
| WO | 2018085936 A1 | 5/2018 | |
| WO | 2019058096 A1 | 3/2019 | |

OTHER PUBLICATIONS

Extended European Search Report received for EP Application No. 17275146.3, dated Mar. 26, 2018. 7 pages.

GB Combined Search and Examination Report under Sections 17 and 18(3) received for GB Application No. 1803782.0, dated Aug. 31, 2018. 6 pages.

GB Search Report under Section 17(5) received for GB Application 1715144.0, dated Jan. 31, 2018. 4 pages.

GB Search Report under Section 17(6) received for GB Application 1715144.0 (as it relates to claim 10), dated May 30, 2018. 3 pages.

Castles, et al., "Microwave dielectric characterisation of 3D-printed BaTiO3/ABS polymer composites," Scientific Reports, vol. 6, No. 22714. Mar. 4, 2016. 8 pages.

Grant, et al., "Manufacture of electrical and magnetic graded and anisotropic materials for novel manipulations of microwaves," Philosophical Transactions of The Royal Society A: Mathematical, Physical and Engineering Sciences, vol. 373, No. 2049. Aug. 28, 2015. 14 pages.

Hall, et al., "Piezoelectric/electrostrictive multimaterial PMN-PT monomorph actuators," Journal of the European Ceramic Society, Elsevier Science Publishers, vol. 25, No. 12. Jan. 1, 2005. pp. 2991-2997.

Lugo, et al., Ku-band Additive Manufactured Multilayer Dielectric Rod Waveguide, IEEE 18th Wireless and Microwave Technology Conference, Apr. 24, 2017. 3 pages.

Zhang, et al., Fabrication and dielectric properties of Ba0.6Sr0.4TiO3/acrylonitrile-butadiene-styrene resin composites, Journal of Materials Science. Materials in Electronics, vol. 28, No. 12. Mar. 1, 2017. pp. 8960-8968.

\* cited by examiner

MATERIAL FOR 3D PRINTING AND A 3D PRINTED DEVICE

FIELD

The present invention relates to a material for 3D printing and a 3D printed device.

BACKGROUND TO THE INVENTION

Generally, ceramic materials may have relatively high dielectric constants (also known as relative permittivities) and thus may provide relatively high capacitances and/or relatively high volumetric electrical energy storage densities, for example at least 1 J/cm$^3$. However, ceramic materials may have relatively low dielectric strengths of at most 500 V/mm and/or catastrophic breakdown failure modes, which may result from microstructural defects therein. In addition, processing methods of ceramic materials may be relatively limited, thereby limiting complexities of electrical energy storage devices, for example capacitors, formed therefrom.

Furthermore, conventional electrical energy storage devices formed by flowing liquid dielectric resins between electrodes require relatively complex electrode designs to accommodate for flow of the resins, air pockets formed by incomplete flow of the resins and/or shrinkage of the resins upon curing and/or solidification, for example. Additionally and/or alternatively, complex jig arrangements are required for these conventional electrical energy storage devices.

Hence, there is a need to improve materials for electrical energy storage devices such as capacitors.

SUMMARY OF THE INVENTION

According to a first aspect of the invention, there is provided a material for 3D printing comprising:
a polymeric composition comprising a thermoplastic polymer; and
from 50 to 99 wt. % ceramic particles comprising a metal, wherein at least 50% by weight of the particles have a diameter in a range from 10 to 100 μm;
wherein the material has a dielectric strength of at least 5 kV/mm and/or a dielectric constant of at least 5.

According to a second aspect of the invention, there is provided a filament for Fused Deposition Modelling (FDM) formed from the material according to the first aspect.

According to a third aspect of the invention, there is provided a method of providing a material for 3D printing comprising:
sintering ceramic particles comprising a metal;
milling the sintered particles, wherein at least 50% by weight of the milled particles have a diameter in a range from 10 to 100 μm;
mixing the milled particles in an amount of from 50 to 99 wt. % with a polymeric composition comprising a thermoplastic polymer to provide a mixture;
heating the mixture thereby melting the thermoplastic; and
cooling the mixture thereby providing the material;
wherein the material has a dielectric strength of at least 5 kV/mm and/or a dielectric constant of at least 5.

According to a fourth aspect of the invention, there is provided an electrical energy storage device formed at least in part by Fused Deposition Modelling (FDM), wherein the at least part of the electrical energy storage device has a dielectric strength of at least 5 kV/mm and/or a dielectric constant of at least 5.

According to a fifth aspect of the invention, there is provided a method of forming an electrical energy storage device at least in part by Fused Deposition Modelling (FDM), the method comprising:
providing a filament according to the second aspect;
melting at least a part of the filament in an oxygen-free atmosphere;
solidifying the melted part of the filament to form at least a part of the electrical energy storage device, wherein the formed at least part of the electrical energy storage device has a dielectric strength of at least 5 kV/mm and/or a dielectric constant of at least 5.

According to a sixth aspect of the invention, there is provided use of a material according to the first aspect or a filament according to the second aspect to provide at least a part of an electrical energy storage device according to the fourth aspect.

DETAILED DESCRIPTION OF THE INVENTION

According to the present invention there is provided a material for 3D printing, as set forth in the appended claims. Also provided is a filament of the material, a method of providing the material, a device formed from the material, a method of forming the device and use of the material to provide a device. Other features of the invention will be apparent from the dependent claims, and the description that follows.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

According to the first aspect, there is provided a material for 3D printing comprising:
a polymeric composition comprising a thermoplastic polymer; and
from 50 to 99 wt. % ceramic particles comprising a metal, wherein at least 50% by weight of the particles have a diameter in a range from 10 to 100 μm;
wherein the material has a dielectric strength of at least 5 kV/mm and/or a dielectric constant of at least 5.

Generally, ceramic materials may have relatively high dielectric constants (also known as relative permittivities) and thus may provide relatively high capacitances and/or relatively high volumetric electrical energy storage densities, for example at least 1 J/cm$^3$. However, ceramic materials may have relatively low dielectric strengths of at most 500 V/mm and/or catastrophic breakdown failure modes, which may result from microstructural defects therein. In addition, processing methods of ceramic materials may be relatively limited, thereby limiting complexities of devices formed therefrom.

The inventors have determined that by providing the ceramic particles in the material comprising additionally the polymeric composition comprising the thermoplastic polymer, the dielectric strength of the material may be increased compared with the ceramic materials as described above, to the dielectric strength of at least 5 kV/mm. Without wishing to be bound by any theory, by providing the ceramic as particles, probabilities of microstructural defects therein may be reduced, compared with a bulk ceramic material. Without wishing to be bound by any theory, by providing the ceramic as particles mutually isolated, at least in part, by the polymeric composition comprising the thermoplastic polymer, breakdown may be retarded. Furthermore, by including the ceramic particles in the material in an amount of from 50 to 99 wt. %, the material may still have relatively high dielectric constant of at least 5, such that a relatively high capacitance and/or a relatively high volumetric electrical energy storage density of the material may be provided. In addition, by providing the material for 3D printing, complex electrical energy storage devices may be formed by 3D printing therefrom. In this way, relatively complex shapes of the electrical energy storage device may be provided, as formed by the FDM. By forming the electrical energy storage device at least in part by FDM, net or near-net solid shapes may be provided that may be assembled with corresponding electrodes, simplifying electrode design and/or manufacture and/or reducing or eliminating further processing steps and/or jig arrangements.

Dielectric Strength and Dielectric Constant

Generally, for a specific configuration of a dielectric material and electrodes, dielectric strength is the minimum applied electric field that results in breakdown of the dielectric material. Increasing the dielectric strength of a material may increase a breakdown electrical field of a device formed therefrom and hence increase an amount of electrical energy storable by the device. The dielectric strengths of electrically insulating materials may be determined according to ASTM D149-09(2013), for example.

In one example, the material has a dielectric strength of at least 5 kV/mm, at least 6 kV/mm, at least 7 kV/mm, at least 8 kV/mm, at least 9 kV/mm or at least 10 kV/mm.

Generally, relative permittivity (also known as dielectric constant) of a material is its (absolute) permittivity expressed as a ratio relative to the permittivity of vacuum.

Relative permittivity $\in_r(\omega)$ is defined as $$\epsilon_r(\omega) = \frac{\epsilon(\omega)}{\epsilon_0}$$

where $\in(\omega)$ is the complex frequency-dependent absolute permittivity of the material, and $\in_0$ is the vacuum permittivity.

In one example, the dielectric constant of the material is the relative permittivity $\in_r(\omega)$ of the material.

Relative permittivity $\in_r(\omega)$ is a dimensionless number that is in general complex-valued; its real $\in'_r(\omega)$ and imaginary $\in''_r(\omega)$ parts are denoted as:

$$\in_r(\omega)=\in'_r(\omega)-i\in''_r(\omega)$$

In one example, the dielectric constant of the material is the real part $\in'_r(\omega)$ of the relative permittivity $\in_r(\omega)$ of the material.

Increasing the dielectric constant of a material may increase a capacitance of a device formed therefrom and hence increase a volumetric electrical energy storage density of the device. The dielectric constants of ceramic dielectrics may be determined according to ASTM D2149-13, for example.

In one example, the material has a dielectric constant of at least 5, at least 6, at least 7, at least 8, at least 9 or at least 10.

In one example, the material has the dielectric strength of at least 5 kV/mm and the dielectric constant of at least 5.

In one example, the material has a dielectric strength of at least 8 kV/mm and/or a dielectric constant of at least 10.

In one example, the ceramic particles comprising the metal comprise and/or are dielectric ceramic particles comprising the metal.

3D Printing

Generally, 3D printing, also known as additive manufacturing (AM), refers to processes used to create three-dimensional articles in which layers of material are formed under computer control to create the articles. Stereolithography (SLA) and DLP (Digital Light Processing) are examples of 3D printing processes in which flowable liquid formulations are formed into solidified articles. Fused deposition modelling (FDM)®, also known as fused filament fabrication (FFF) is an example of a 3D printing process in which filaments of solid plastics materials, for example, are heated and extruded, thereby providing the layers of the materials. Metal wires may also be used for FDM.

Typically in FDM, for example, a filament of a thermoplastic material is fed into a heated extrusion nozzle at a controlled rate. The nozzle heats the thermoplastic material above its glass transition temperature, melting the thermoplastic material which is deposited as part of a layer of the article and subsequently cools, thereby resolidifying.

In one example, the material is for FDM.

By using materials having different respective compositions, for example, articles may be formed by 3D printing to provide regions of the articles having different respective properties. In this way, articles having anisotropic and/or inhomegeneous properties, for example structural and/or electrical properties, may be formed by 3D printing.

Material

The material of the first aspect is for 3D printing. Hence, the material may be a solid, for example a rod, a filament, a film, a sheet, and/or particles such as a powder and/or granules and/or pellets (i.e. a flowable solid). Additionally and/or alternatively, the material may be a liquid, for example a flowable liquid material, as described below in more detail.

Generally, flowable liquid materials for 3D printing may have dynamic or absolute viscosities in a range of from 1 to 100 centipoise or more, as known to the person skilled in the art. Some specialist 3D printers have been designed to 3D print flowable liquid materials having dynamic or absolute viscosities in a range of 3000 centipoise or more. However, many conventional 3D printers have been designed to 3D print flowable liquid materials having dynamic or absolute viscosities in a range of from 1 to 100 centipoise. A dynamic viscosity of the flowable liquid material may depend, at least in part, on an amount and/or a type of the particles in the liquid flowable material, such that an increased amount and/or a change of the type of the particles may increase the dynamic viscosity. That is, a maximum dynamic viscosity of the flowable liquid material suitable for 3D printing may in turn determine, at least in part, a maximum amount and/or a type of the particles included therein. Hence, it is desirable that the particles are of a type and/or included in an amount that provides the dielectric strength of at least 5 kV/mm and/or the dielectric constant of at least 5 while the flowable liquid material has a dynamic viscosity suitable for 3D printing. For example, the flowable liquid material preferably has a stable viscosity at a given temperature. For example, the flowable liquid material preferably does not develop a significantly non-linear viscosity—shear rate property such as thixotropy. In one example, a dynamic viscosity of the flowable liquid material of the first aspect is from 1 to 10,000 centipoise, preferably from 1 to 1000 centipoise, more preferably from 1 to 100 centipoise. The dynamic viscosity may be measured at 20° C., for example using a Brookfield Dial Reading Viscometer model LV, RV or HA in accordance with the manufacturer's instructions.

Particles

The material comprises from 50 to 99 wt. % ceramic particles comprising the metal, wherein at least 50% by weight of the particles have a diameter in a range from 10 to 100 µm.

It should be understood that the material comprises from 50 to 99 wt. % ceramic particles by weight of the material.

It should be understood that at least 50% of the particles by weight of the particles have a diameter in a range from 10 to 100 µm.

The inventors have determined that at such amounts of the particles in the material of 50 to 99 wt. % particles, the material is suitable for 3D printing and has the dielectric strength of at least 5 kV/mm and/or the dielectric constant of at least 5. Furthermore, the inventors have determined at such sizes of the particles, wherein at least 50% by weight of the particles have a diameter in a range from 10 to 100 µm, a uniform dispersion of the particles in the material may be achieved, thereby providing more homogeneous structural and/or electrical properties, for example. Conventionally, it may be expected that relatively smaller particles, for example having diameters of at most 0.1 µm, would be preferable such that the material has the dielectric strength of at least 5 kV/mm and/or the dielectric constant of at least 5. However, the inventors have determined that such relatively smaller particles may not be uniformly dispersed in the material during manufacture thereof. For example, such relatively smaller particles may tend to agglomerate and/or not disperse uniformly in a melt of the polymeric composition comprising the thermoplastic polymer due, at least in part, to a relatively high melt viscosity (MV) (i.e. a relatively low melt flow index) of the polymeric composition comprising the thermoplastic polymer, as described below in more detail.

Ceramic Particles Comprising a Metal

The material comprises from 50 to 99 wt. % ceramic particles comprising the metal.

In one example, the metal is a transition metal, for example a first row, a second row or a third row transition metal. In one example, the metal is Sc, Ti, V, Cr, Mn, Fe, Co, Ni, Cu or Zn. In one example, the metal is Y, Zr, Nb, Mo, Tc, Ru, Rh, Pd, Ag or Cd. In one example, the metal is Hf, Ta, W, Re, Os, Ir, Pt, Au or Hg. In one example, the metal is a lanthanide. In one example, the metal is La, Ce, Pr, Nd, Pm, Sm, Eu, Gd, Tb, Dy, Ho, Er, Tm, Yb or Lu. In one example, the metal is an actinide. In one example, the metal is Ac, Th, Pa, U, Np, Pu, Am, Cm, Bk, Cf or Es.

Examples of ceramics particles comprising the metal include oxides, silicates, sulphides, sulphates, halides, carbonates, phosphates, nitrides, borides, hydroxides of the metal. These inorganic compounds may include a second such metal, for example, mixed oxides such as zirconium titanate $ZrTiO_4$ or a mixture of barium titanate and strontium titanate such as $(Ba_x, Sr_{1-x})TiO_3$, for example. The particles may comprise TCP (tricalciumphosphate), MCP (monocalciumphosphate), DCP (dicalciumphosphate), tetracalciumphosphate, hydroxylapatite, alpha-TCP, beta-TCP, titanium oxide (titania), aluminium oxide (alumina), zirconium oxide (zirconia), yttrium oxide (yttria), yttria stabilized zirconia, indium oxide, indium tin oxide, boron nitride, silicon carbide, boron carbide, tungsten carbide, beryllium oxide, zeolite, cerium oxide (ceria), tungsten disilicide, sodium silicide, platinium silicide, zirconium nitride, tungsten nitride, vanadium nitride, tantalum nitride, niobium nitride, silicon boride, barium titanate, lead zirconate titanate, zinc oxide, potassium niobate, lithium niobate, sodium tungstate, sodium chloride, sodium nitrate, potassium nitrate, potassium chloride, magnesium chloride, calcium chloride, calcium nitrate, magnesium nitrate, strontium oxide, strontium phosphate, strontium titanate, calcium sulfate, barium sulfate, calcium carbonate, sodium carbonate and/or sodium fluoride or mixtures thereof.

In one example, the particles comprise an oxide of the metal, wherein the metal is preferably a transition metal.

Preferably, the particles comprise a transition metal and/or an oxide thereof. More preferably, the particles comprise a second row transition metal and/or an oxide thereof, for example zirconium titanate.

In one example, the particles comprise a plurality of metals.

Dielectric Ceramic Particles

In one example, the ceramic particles comprise dielectric ceramic particles.

In one example, the ceramic particles comprise paraelectric ceramic particles. In one example, the ceramic particles comprise ferroelectric ceramics particles. In one example, the ceramic particles comprise paraelectric ceramic particles and ferroelectric ceramics particles. Generally, paraelectric ceramic particles, for example based on titanium dioxide $TiO_2$ and optionally modified using Zn, Zr, Nb, Mg, Ta, Co and/or Sr, provide stable and linear capacitance values within specified temperature ranges and low losses at high frequencies. However, paraelectric ceramic particles may provide relatively lower permittivities so that capacitance values may be relatively lower. Examples of paraelectric ceramic particles include $TiO_2$, $MgNb_2O_6$, $ZnNb_2O_6$, $MgTa_2O_6$, $ZnTa_2O_6$, $(ZnMg)TiO_3$, $ZrSn)TiO_4$ and $Ba_2Ti_9O_{20}$. Generally, ferroelectric ceramics particles, for example based on barium titanate $BaTiO_3$ and optionally modified using aluminium silicate, magnesium silicate and aluminium oxide, may provide relatively higher permittivities so that capacitance values may be relatively higher.

In one example, the particles comprise one or more of dielectric ceramic particles detailed in Table 1.

TABLE 1

Ceramic particles available from Morgan Advanced Materials (UK). Ceramic type generally indicates the metal and/or the metals included in the ceramic, which may be an oxide and/or a mixed oxide, for example, optionally including other additives.

| Ceramic type | Trade name | Dielectric constant $\epsilon_r(\omega)$ |
|---|---|---|
| BaSmTi | D77 | 76.5 |
| ZrTiSn | D36 | 37 |
| CaMgTi | D20 | 20 |
| MgSi | D6 | 6.5 |
| MgTi | L103 | 15 |
| CaMgTi | K20 | 20 |
| ZrTiSn | K36 | 37 |
| BaSmTi | K77 | 77 |
| TiO2 | K90 | 90 |
| CaTi | K200 | 200 |
| BaCaZrTi | K400 | 400 |
|  | K600 | 400 |
|  | K1150 | 1150 |
| BaSrTi | K1150L | 1500 |
|  | K1700 | 1700 |
|  | K2500 | 2500 |
| BaTi | K2100 | 2100 |
|  | K3300 | 3300 |
|  | K3500 | 3750 |
|  | K3800 | 3800 |
| BaCaZrTi | K3500H | 4500 |

In one example, the particles comprise K36, K200 and/or K1700.

Particle Size

At least 50% by weight of the particles have a diameter in the range from 10 to 100 μm.

The inventors have identified that a size, for example the diameter, of the particles (or a largest dimension of an agglomerate) may affect dispersion thereof in the material, viscosity of a melt of the material for example during extrusion and/or homogeneity in a device formed by 3D printing the material. Non-uniform dispersion in the material may result in inhomogeneity in the device formed by 3D printing the material, such that regions in the device have relatively higher or relatively lower dielectric strengths and/or dielectric constants than desired. Such inhomogeneity in the device is inherently unsuitable for energy storage devices, for example. Relatively smaller particles may adversely affect dispersion. Relatively larger particles may result in blockages during 3D printing, for example during extrusion during FDM.

For regular shapes, the diameter may refer to the diameter of a sphere or a rod, for example, or to the side of a cuboid. The diameter may also refer to the length of the rod. For irregular shapes, the diameter may refer to a largest dimension, for example, of the particles. Suitably, the particle size distribution is measured by use of light scattering measurement of the particles in an apparatus such as a Malvern Mastersizer 3000, arranged to measure particle sizes from 10 nm to 3500 micrometres, with the particles wet-dispersed in a suitable carrier liquid (along with a suitable dispersant compatible with the particle surface chemistry and the chemical nature of the liquid) in accordance with the equipment manufacturer's instructions and assuming that the particles are of uniform density.

At least 50% by weight of the particles have a diameter in the range from 10 to 100 μm.

In one example, at least 50% by weight of the particles have a diameter in a range from 15 to 45 μm.

In one example, at least 50% by weight of the particles have a diameter at most 100 μm, at most 90 μm, at most 80 μm, at most 70 μm, at most 60 μm, at most 50 μm, at most 45 μm, at most 40 μm, at most 35 μm, at most 30 μm, at most 25 μm, at most 20 μm or at most 15 μm. In one example, at least 50% by weight of the particles have a diameter at least 90 μm, at least 80 μm, at least 70 μm, at least 60 μm, at least 50 μm, at least 45 μm, at least 40 μm, at least 35 μm, at least 30 μm, at least 25 μm, at least 20 μm, at least 15 μm or at least 10 μm.

In one example, at least 90% by weight of the particles have a diameter at most 100 μm, at most 90 μm, at most 80 μm, at most 70 μm, at most 60 μm, at most 50 μm, at most 45 μm, at most 40 μm, at most 35 μm, at most 30 μm, at most 25 μm, at most 20 μm or at most 15 μm. In one example, at least 90% by weight of the particles have a diameter at least 90 μm, at least 80 μm, at least 70 μm, at least 60 μm, at least 50 μm, at least 45 μm, at least 40 μm, at least 35 μm, at least 30 μm, at least 25 μm, at least 20 μm, at least 15 μm or at least 10 μm.

In one example, at least 95% by weight of the particles have a diameter at most 100 μm, at most 90 μm, at most 80 μm, at most 70 μm, at most 60 μm, at most 50 μm, at most 45 μm, at most 40 μm, at most 35 μm, at most 30 μm, at most 25 μm, at most 20 μm or at most 15 μm. In one example, at least 95% by weight of the particles have a diameter at least 90 μm, at least 80 μm, at least 70 μm, at least 60 μm, at least 50 μm, at least 45 μm, at least 40 μm, at least 35 μm, at least 30 μm, at least 25 μm, at least 20 μm, at least 15 μm or at least 10 μm.

In one example, at least 99% by weight of the particles have a diameter at most 100 μm, at most 90 μm, at most 80 μm, at most 70 μm, at most 60 μm, at most 50 μm, at most 45 μm, at most 40 μm, at most 35 μm, at most 30 μm, at most 25 μm, at most 20 μm or at most 15 μm. In one example, at least 99% by weight of the particles have a diameter at least 90 μm, at least 80 μm, at least 70 μm, at least 60 μm, at least 50 μm, at least 45 μm, at least 40 μm, at least 35 μm, at least 30 μm, at least 25 μm, at least 20 μm, at least 15 μm or at least 10 μm.

Particles of these sizes may be termed microparticles, having sizes in a range of from 0.1 to 100 μm. Generally, microparticles tend to agglomerate, to reduce surface energy. Agglomerates are an assembly of a variable number of the particles and the agglomerates may change in the number of particles and/or shape, for example. Micropowders are solid powders of microparticles, often containing microparticle agglomerates. These agglomerates may be redispersed (at least to some extent) in the solid state using, for example, ultrasonic processing. Microparticle dispersions are suspensions of microparticles in a liquid carrier, for example water or organic solvent/organic matrix. Agglomeration of the microparticles in the microparticle dispersions may depend, for example, on temperature, pressure, pH-value, and/or viscosity. Generally, agglomeration of the particles may result in non-uniform dispersion of the particles in the material and/or inhomogeneity of a device formed by 3D printing therefrom. Hence, a suitable particle size may be also a balance between reducing agglomeration while avoiding blockages in use, all while achieving a uniform dispersion and homogeneity. Furthermore, a form of the particles (micropowder or suspension) may affect dispersion of the particles in the material, during processing for example. The inventors have determined that particles of the described sizes, for example provided as micropowders may provide this appropriate balance.

Particle Shape

The particles may have regular, such as spherical, cuboidal or rod, shapes and/or irregular, such as spheroidal, flake or granular, shapes (also known as morphologies).

Particle Amount

The material comprises from 50 to 99 wt. % ceramic particles comprising the metal.

The inventors have determined that even at such relatively high amounts of particles in the material so as to provide the relatively high dielectric constant of at least 5, the material may have the relatively high dielectric strength of at least 5 kV/mm, while the material is suitable for 3D printing, for example suitable for forming filaments for FDM and/or extrusion thereof. Additionally, a uniform dispersion of the particles in the material and/or in a device formed by 3D printing the material therefrom may be achieved.

In one example, the material comprises at least 50 wt. %, at least 55 wt. %, at least 60 wt. %, at least 65 wt. %, at least 70 wt. %, at least 75 wt. %, at least 80 wt. %, at least 85 wt. %, at least 90 wt. %, at least 95 wt. % or at least 97.5 wt. % ceramic particles comprising the metal. In one example, the material comprises at most 55 wt. %, at most 60 wt. %, at most 65 wt. %, at most 70 wt. %, at most 75 wt. %, at most 80 wt. %, at most 85 wt. %, at most 90 wt. %, at most 95 wt. %, at most 97.5 wt. %, or at most 99 wt. % ceramic particles comprising the metal.

Zirconium Titanate $ZrTiO_4$

In one example, the particles may comprise and/or be based on and/or be zirconium titanate $ZrTiO_4$ (CAS #: 12036-70-3) particles. The inventors have determined that the material comprising such $ZrTiO_4$ particles in the amounts described, wherein at least 50% by weight of the particles have a diameter in a range from 10 to 100 μm is particularly suitable for 3D printing. Firstly, the material may have the dielectric strength of at least 5 kV/mm. Secondly, the material may have the dielectric constant of at least 5. Thirdly, a uniform dispersion of the particles in the material may be achieved.

$ZrTiO_4$ is orthorhombic, having a space group Pbcn and a theoretical density of 5.15 g/cm$^3$. $ZrTiO_4$ has a relative permittivity of 42. Modifying $ZrTiO_4$ using additives (i.e. the particles are based on $ZrTiO_4$), for example metals such as Sn and Pb and/or oxides such as ZnO and $La_2O_3$, may increase the relative permittivity. ZnO and $La_2O_3$ may be included as sintering aids, for example.

In one example, the particles comprise K36, based on zirconium titanate $ZrTiO_4$ and available from Morgan Advanced Materials (UK). Table 2 summarises results of X-ray fluorescence (XRF) analysis of K36. In addition to Zr and Ti, K36 includes Sn, Zn, Hf and La.

TABLE 2

X-ray fluorescence (XRF) analysis of K36 available from Morgan Advanced Materials (UK).

| Elements | Sample Bulk Good Bottom | Good Side | Thick 1 | Thick 2 | Thick 3 | Thin | Bottom Bad Bottom | Bad Bottom 2 | Bad Bottom 3 | Bad Bottom 4 |
|---|---|---|---|---|---|---|---|---|---|---|
| Ti | 27.520 | 31.761 | 25.405 | 28.388 | 21.730 | 27.120 | 30.226 | 30.731 | 31.651 | 28.973 |
| Zn | 1.105 | 1.017 | 1.012 | 1.112 | 0.987 | 1.060 | 1.516 | 1.342 | 1.249 | 1.291 |
| Zr | 51.980 | 46.488 | 51.050 | 49.981 | 52.680 | 50.058 | 45.205 | 44.959 | 44.034 | 45.702 |
| Sn | 16.907 | 17.913 | 20.438 | 18.026 | 22.416 | 19.441 | 20.441 | 20.492 | 20.141 | 21.330 |
| La | 0.880 | 1.041 | 0.674 | 0.953 | 0.752 | 0.847 | 1.151 | 0.878 | 1.385 | 1.188 |
| Hf | 1.609 | 1.780 | 1.420 | 1.539 | 1.434 | 1.474 | 1.461 | 1.598 | 1.540 | 1.517 |
| Zr + Ti + Sn | 96.407 | 96.162 | 96.893 | 96.395 | 96.826 | 96.619 | 96.619 | 95.872 | 96.182 | 95.826 |

| | Stats Bulk | | | Stats Bottom | | |
|---|---|---|---|---|---|---|
| Elements | Average | Standard Deviation | Coefficient of Variation | Average | Standard Deviation | Coefficient of Variation |
| Ti | 26.987 | 3.322 | 12% | 30.395 | 1.117 | 4% |
| Zn | 1.049 | 0.052 | 5% | 1.350 | 0.117 | 9% |
| Zr | 50.373 | 2.178 | 4% | 44.975 | 0.699 | 2% |
| Sn | 19.190 | 2.011 | 10% | 20.601 | 0.510 | 2% |
| La | 0.858 | 0.133 | 15% | 1.151 | 0.209 | 18% |
| Hf | 1.543 | 0.136 | 9% | 1.529 | 0.057 | 4% |
| Zr + Ti + Sn | N/A | N/A | N/A | N/A | N/A | N/A |

Polymeric Composition and Thermoplastic Polymer

The material for 3D printing comprises the polymeric composition comprising the thermoplastic polymer.

In one example, the material comprises at least 1 wt. %, at least 2 wt. %, at least 5 wt. %, at least 10 wt. %, at least 15 wt. %, at least 20 wt. %, at least 25 wt. %, at least 30 wt. %, at least 35 wt. %, at least 40 wt. %, at least 45 wt. % or at least 50 wt. % polymeric composition comprising the thermoplastic polymer. In one example, the material comprises at most 1 wt. %, at most 2 wt. %, at most 5 wt. %, at most 10 wt. %, at most 15 wt. %, at most 20 wt. %, at most 25 wt. %, at most 30 wt. %, at most 35 wt. %, at most 40 wt. %, at most 45 wt. % or at most 50 wt. % polymeric composition comprising the thermoplastic polymer.

In one example, the thermoplastic polymer is selected from a group consisting of poly(methyl methacrylate) (PMMA), acrylonitrile butadiene styrene (ABS), aliphatic or semi-aromatic polyamides, polylactic acid (polylactide) (PLA), polybenzimidazole (PBI), polycarbonate (PC), polyether sulfone (PES), polyetherimide, polyethylene (PE), polypropylene (PP), polymethylpentene (PMP) and polybutene-1 (PB-1), polystyrene (PS), polyvinyl chloride (PVC) thermoplastic polyurethane (TPU), poly(meth)acrylate, polyphenylene sulphone (PPSU), high density polyethylene HDPE, polyetherimide (PEI), polyether ether ketone (PEK) and nylon, as well as homopolymers, copolymers, and ionomers thereof, and combinations of any of these materials. Methacrylate may include both methacrylate (for example methyl methacrylate, ethyl methacrylate, etc.), acrylates (for example ethylhexyl acrylate, ethyl acrylate, etc.), and/or a mixture thereof.

In one example, the thermoplastic polymer is PLA. PLA is a biodegradable and bioactive thermoplastic aliphatic polyester derived from renewable resources, such as corn starch, cassava roots, chips or starch, or sugarcane. PLA is suitable for 3D printing.

Typically, PLA has a MFI at 210° C./2.16 kg of from 6 to 78 g/10 min (ASTM D1238) and a MFI at 190° C./2.16 kg of from 1.5 to 36 g/10 min (ISO 1133). Typically, PLA has a glass transition temperature of from 134 to 136° F. (ASTM E1356) or of from 111 to 145° F. (DSC). Typically, PLA has a melting temperature of from 315 to 338° F. Typically, PLA has a dielectric strength of at least 5 MV/cm at room temperature.

Tables 3 and 4 summarise electrical properties and thermal properties of a 3D printed PLA available commercially for FDM from Stratasys Ltd. (USA). Note that electrical properties may depend on an orientation of the 3D printed PLA.

TABLE 3

Electrical properties of a 3D printed PLA available commercially for FDM from Stratasys Ltd. (USA).

| ELECTRICAL PROPERTIES | TEST METHOD | XY | ZX |
| --- | --- | --- | --- |
| Volume Resistivity | ASTM D257 | 2.9E+15 ohm-cm | 3.24E+15 ohm-cm |
| Dielectric Constant | ASTM D150-98 | 1.51 | 2.33 |
| Dissipation Factor | ASTM D150-98 | 0.003 | 0.005 |
| Dielectric Strength | ASTM D149-09, Method A | 154 V/mil | 293 V/mil |

TABLE 4

Thermal properties of a 3D printed PLA available commercially for FDM from Stratasys Ltd. (USA).

| THERMAL PROPERTIES | TEST METHOD | ENGLISH | METRIC |
| --- | --- | --- | --- |
| Heat Deflection (HDT) @ 66 psi | ASTM D648 | 127° F. | 53° C. |
| Heat Deflection (HDT) @ 264 psi | ASTM D648 | 124° F. | 51° C. |
| Vicat Softening Temperature (Rate B/50) | ASTM D1525 | 129° F. | 54° C. |
| Glass Transition Temperature (Tg) | DMA (SSYS) | 145° F. | 63° C. |
| Coefficient of Thermal Expansion (flow) | ASTM E831 | 56 × 10−06 μin/ (in · ° F.) | 101 × 10−06 μm/ (m · ° C.) |
| Coefficient of Thermal Expansion (xflow) | ASTM E831 | 57 × 10−06 μin/ (in · ° F.) | 102 × 10−06 μm/ (m · ° C.) |

Melt Flow Index

The melt flow index (MFI) is a measure of the ease of flow of the melt of a thermoplastic polymer. The MFI is defined as the mass of polymer, in grams, flowing in ten minutes through a capillary of a specific diameter and length by a pressure applied via prescribed alternative gravimetric weights for alternative prescribed temperatures. Methods of measurement of the MFI may be according to ASTM D1238, ISO 1133, BS 2782 Method 720A or DIN 53735, for example. Generally, the MFIs of polymeric compositions comprising thermoplastic polymers are dependent at least on measurement temperature as well as compositions of the polymeric compositions comprising thermoplastic polymers.

Generally, for injection moulding of polymeric compositions comprising thermoplastic polymers, a MFI in a range from 5 to 100 (g/10 minutes) is preferred. Generally, for rotational moulding of polymeric compositions comprising thermoplastic polymers, a MFI in a range from 5 to 10 (g/10 minutes) is preferred. Generally, for pipe and profile extrusion of polymeric compositions comprising thermoplastic polymers, a MFI in a range from 0.2 to 2 (g/10 minutes) is preferred.

In one example, the polymeric composition comprising the thermoplastic polymer has a MFI at 210° C./2.16 kg of from 1 to 100 g/10 min (ASTM D1238) and/or a MFI at 190° C./2.16 kg of from 0.1 to 50 g/10 min (ISO 1133).

A preferred material according to the first aspect comprises:
a polymeric composition comprising polylactic acid (PLA); and
from 50 to 95 wt. % ceramic particles based on zirconium titanate $ZrTiO_4$, wherein at least 50% by weight of the particles have a diameter in a range from 15 to 45 μm;
wherein the material has a dielectric strength of at least 8 kV/mm and/or a dielectric constant of at least 10.

This preferred material is particularly suitable for the other aspects, as set out below.

According to the second aspect, there is provided a filament for Fused Deposition Modelling (FDM) formed from the material according to the first aspect.

In one example, the filament is a monofilament.

In one example, the filament has a diameter in a range of from 0.1 mm to 10 mm, preferably from 1 mm to 5 mm, more preferably from 1.5 mm to 4 mm, for example 1.75 mm or 3 mm.

According to the third aspect, there is provided a method of providing a material for 3D printing comprising:
sintering ceramic particles comprising a metal;
milling the sintered particles, wherein at least 50% by weight of the milled particles have a diameter in a range from 10 to 100 μm;
mixing the milled particles in an amount of from 50 to 99 wt. % with a polymeric composition comprising a thermoplastic polymer to provide a mixture;
heating the mixture thereby melting the thermoplastic; and
cooling the mixture thereby providing the material;
wherein the material has a dielectric strength of at least 5 kV/mm and/or a dielectric constant of at least 5.

The material, the ceramic particles, the metal and/or the polymeric composition comprising the thermoplastic polymer may be as described with respect to the first aspect.

In one example, the sintering the ceramic particles comprises binderless sintering the ceramic particles i.e. in absence of a binder.

In one example, milling the sintered particles comprises ball milling the sintered particles.

In one example, the method comprises providing a filament of the material by extruding the mixture. The filament thus provided may be according to the second aspect.

In one example, the mixing comprises shear mixing the milled particles in the amount of from 50 to 99 wt. % with the polymeric composition comprising the thermoplastic polymer.

In one example, the method comprises providing the polymeric composition comprising the thermoplastic polymer as particles thereof such as a powder and/or granules and/or pellets thereof.

In one example, the method comprises shear mixing the heated mixture.

According to the fourth aspect, there is provided an electrical energy storage device formed at least in part by Fused Deposition Modelling (FDM), wherein the at least part of the electrical energy storage device has a dielectric strength of at least 5 kV/mm and/or a dielectric constant of at least 5.

In one example, the electrical energy storage device comprises and/or is a capacitor. In one example, the part formed by FDM comprises a dielectric material, for example the material according to the first aspect.

In this way, relatively complex shapes of the electrical energy storage device may be provided, as formed by the FDM. By forming the electrical energy storage device at least in part by FDM, net or near-net solid shapes may be provided that may be assembled with corresponding electrodes, simplifying electrode design and/or manufacture and/or reducing or eliminating further processing steps and/or jig arrangements. In contrast, conventional electrical energy storage devices formed by flowing liquid dielectric resins between electrodes require relatively complex electrode designs to accommodate for flow of the resins, air pockets formed by incomplete flow of the resins and/or shrinkage of the resins upon curing and/or solidification, for example. Additionally and/or alternatively, complex jig arrangements are required for such conventional electrical energy storage devices.

In one example, the electrical energy storage device comprises two electrodes and the part formed by FDM has a shape to conform to a gap (i.e. a cavity) therebetween. In one example, the gap includes a dead (also known as blind or unswept) volume, for example a volume not fillable and/or fully fillable by flowing a conventional liquid dielectric resin therein. By forming the part by FDM, shapes to conform to the gap between the electrodes, including dead volumes, may be provided, thereby facilitating manufacture of the electrical energy storage device and/or permitting more complex arrangements of electrodes and/or gaps therebetween.

According to the fifth aspect, there is provided a method of forming an electrical energy storage device at least in part by Fused Deposition Modelling (FDM), the method comprising:
providing a filament according to claim 7;
melting at least a part of the filament in an oxygen-free atmosphere;
solidifying the melted part of the filament to form at least a part of the electrical energy storage device, wherein the formed at least part of the electrical energy storage device has a dielectric strength of at least 5 kV/mm and/or a dielectric constant of at least 5.

The electrical energy storage device may be as described with respect to the fourth aspect.

In one example, the oxygen-free atmosphere is provided by nitrogen, $SF_6$, $H_2$, He and/or mixtures thereof. $SF_6$ has a dielectric strength a factor of about 2.5 greater than $N_2$ and is preferred.

In one example, the formed at least part of the electrical energy storage device has a porosity of at most 1% by volume of the formed at least part of the electrical energy storage device and/or wherein at most 50% by volume of pores therein have a diameter of at most 1 μm.

Generally, porosity is detrimental to dielectric strength. In one example, the formed at least part of the electrical energy storage device has the porosity of at most 1%, at most 0.5% or at most 0.1% by volume of the formed electrical energy storage device.

Generally, relatively larger pores are detrimental to dielectric strength. In one example, at most 50% by volume of pores therein have a diameter of at most 1 μm, at most 0.5 μm or at most 0.1 μm.

In one example, at least 50%, at least 75% or at least 90% by volume of pores therein are isolated (also known as closed) pores i.e. not interconnected (also known as open) pores.

Generally, porosity of the formed at least part of the electrical energy storage device may be determined by porosimetry, for example mercury intrusion porosimetry according to UOP578-11, by reference to the filament, by density according to ASTM D792 or ISO 1183 and/or image analysis of sections thereof.

According to the sixth aspect, there is provided use of a material according to the first aspect or a filament according to the second aspect to provide at least a part of an electrical energy storage device according to the fourth aspect.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Generally, like reference signs denote like features, description of which is not repeated for brevity.

Figure 1:
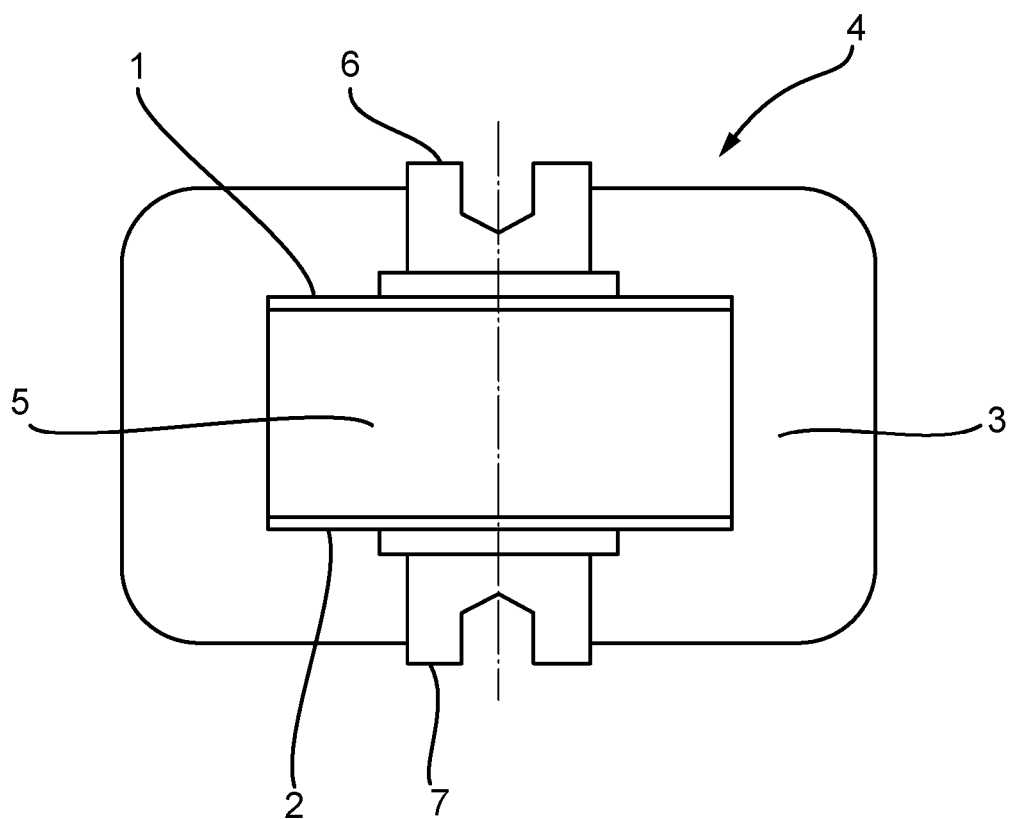
FIG. 1 schematically depicts an electrical energy storage device according to an exemplary embodiment.

FIG. 1 schematically depicts an electrical energy storage device 4 according to an exemplary embodiment.

Particularly, the electrical energy storage device 4 is formed at least in part by Fused Deposition Modelling (FDM), wherein the at least part of the electrical energy storage device 4 has a dielectric strength of at least 5 kV/mm and/or a dielectric constant of at least 5.

In more detail, the electrical energy storage device 4 is a block capacitor 4 which contains a first electrode 1 and a second electrode 2 sandwiching a block of dielectric material 5. The first electrode 1 is connected to an electrical contact 6 and the second electrode 2 is connected to an electrical contact 7. The capacitor structure is then encapsulated (potted) in a suitable potting material 3, so as to avoid electrical breakdown of the capacitor 4.

Particularly, the block of dielectric material 5 is formed by FDM of a material comprising:
a polymeric composition comprising a thermoplastic polymer; and
from 50 to 99 wt. % ceramic particles comprising a metal, wherein at least 50% by weight of the particles have a diameter in a range from 10 to 100 μm;
wherein the material has a dielectric strength of at least 5 kV/mm and/or a dielectric constant of at least 5.

Figure 2A:
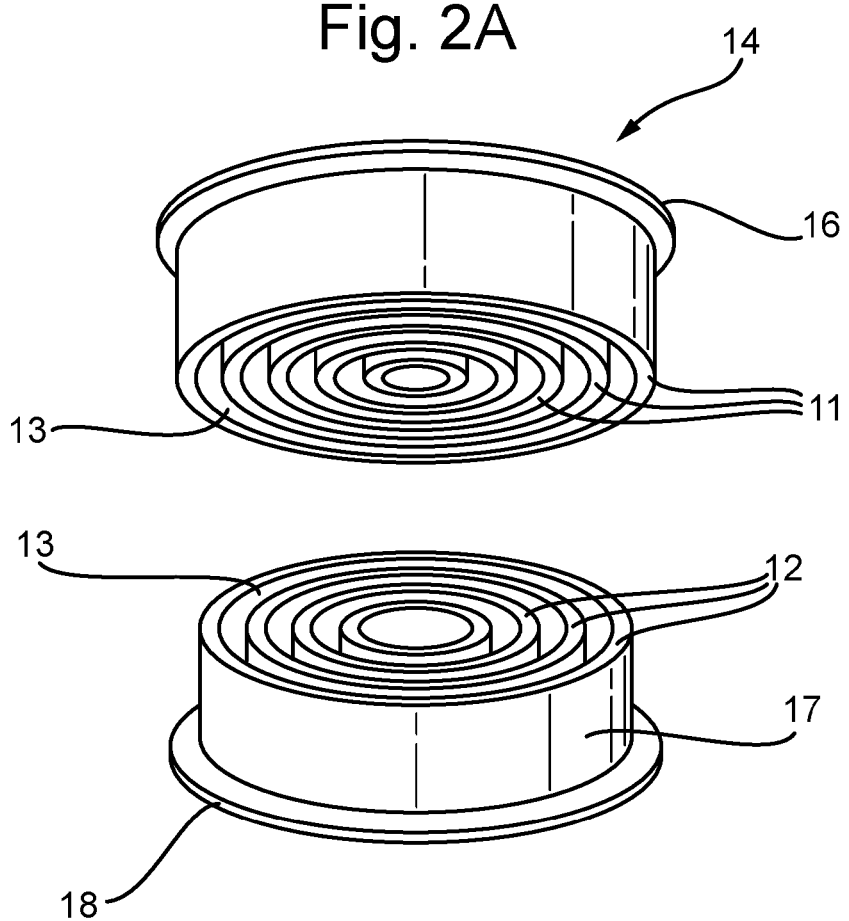
FIGS. 2A-2B schematically depict an electrical energy storage device according to an exemplary embodiment.
Figure 2B:
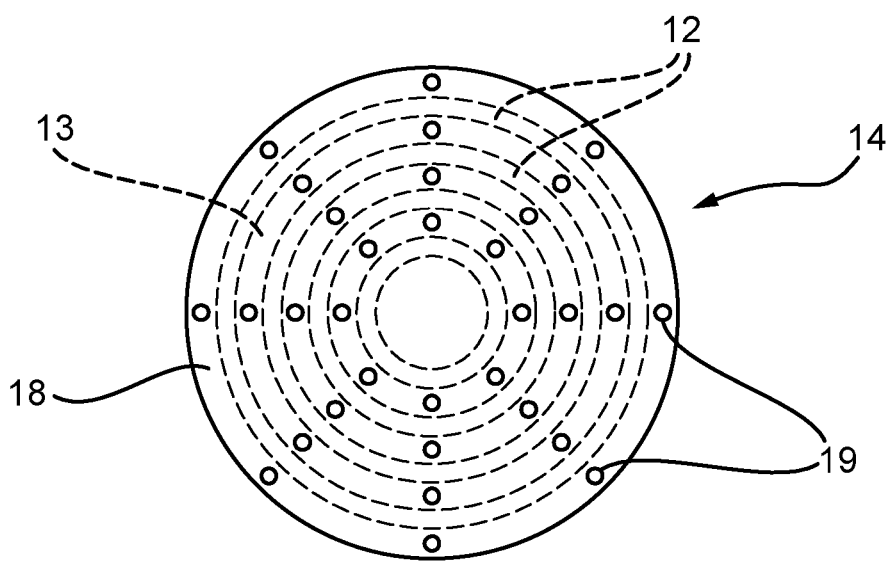

FIGS. 2A-2B schematically depict an electrical energy storage device 14 according to an exemplary embodiment.

Particularly, the electrical energy storage device 14 is formed at least in part by Fused Deposition Modelling (FDM), wherein the at least part of the electrical energy storage device 14 has a dielectric strength of at least 5 kV/mm and/or a dielectric constant of at least 5.

In more detail, the electrical energy storage device 14 is a capacitor set up 14. FIG. 2A shows a side projection of a capacitor set up 14, with a first electrode 16 with protrusions 11, and a second electrode 17, with protrusions 12. The protrusions 11 and 12 have been designed to mate together such that the height of the final mated capacitor plate is only a few millimetres thicker than the thickness of one of the electrodes with its associated protrusions. In between the protrusions 11 and 12, there is a defined gap 13, into which the opposing protrusion and a dielectric material F (not shown) will fit.

On the rear face 18 of the electrode 17, as shown in FIG. 2B, there is a plurality of voids 19, which extend as through holes, which are located in the electrode structure 17. The holes 19 permit the flow of a conventional curable flowable liquid dielectric, for example a resin, into the gaps 13, between the protrusions (dotted lines) 12. Without the presence of the holes 19 the dielectric would not migrate in between the mated protrusions, as the likely gap between the two sets of mated protrusions 11 and 12 will be of the order of a few millimetres.

In contrast, by forming the dielectric material 15 by FDM, rather than using the conventional curable flowable liquid dielectric, the holes 19 are not required, thereby simplifying manufacture of the electrical energy storage device 14. Furthermore, problems associated with air pockets formed by incomplete flow of the conventional curable flowable liquid dielectric and/or shrinkage of the conventional curable flowable liquid dielectric upon curing and/or solidification, for example, may be avoided.

The dielectric material 15 is as described with respect to the dielectric material 5.

Figure 3:
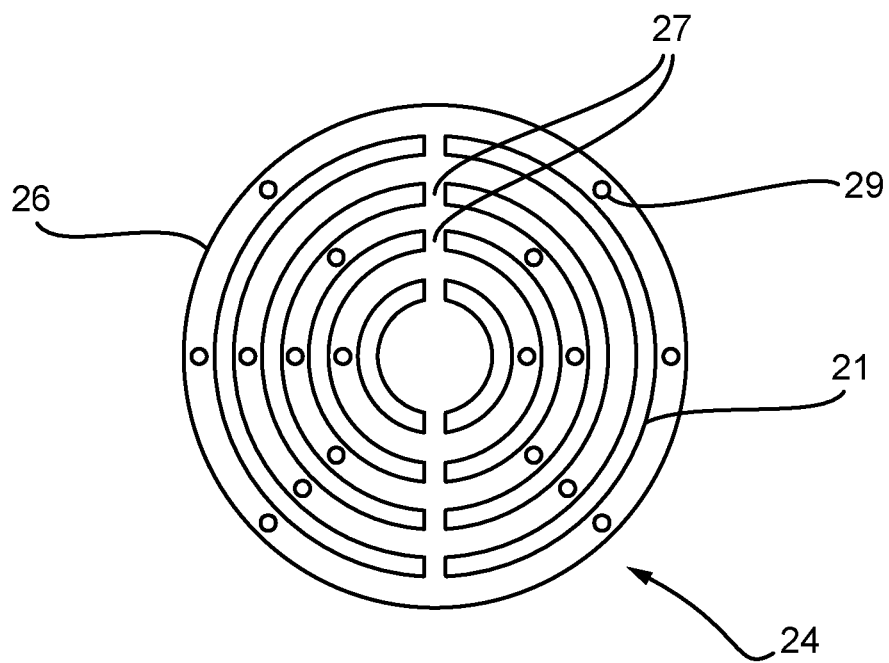
FIG. 3 schematically depicts an electrical energy storage device according to an exemplary embodiment.

FIG. 3 schematically depicts an electrical energy storage device 24 according to an exemplary embodiment.

Particularly, the electrical energy storage device 24 is formed at least in part by Fused Deposition Modelling (FDM), wherein the at least part of the electrical energy storage device 24 has a dielectric strength of at least 5 kV/mm and/or a dielectric constant of at least 5.

In more detail, the electrical energy storage device 24 is a capacitor 24. FIG. 3 shows a top view of one half of the capacitor 24, the electrode 26 has a series of upstanding protrusions 21, which define a generally semi-circular pattern, similar to that shown in FIG. 2A. The generally circular pattern is broken up by voids in the form of slits 27, which extend the entire height of the protrusion 21. There are also additionally further voids in the form of through holes 29. The electrode 26 will have a mating pair (not shown) similar to that shown in FIG. 2A, with similar slits and holes.

When the mated pair are brought together, the holes 29 and slits 27 allow a conventional curable flowable liquid dielectric, for example a resin, to be flowed evenly throughout the mated structure.

In contrast, the electrical energy storage device 24 comprises a dielectric material 25 (not shown) formed by FDM, rather than the conventional curable flowable liquid dielectric, that has a shape to conform with the mated electrodes 26. Hence, the holes 29 and the slits 27 are not required, thereby simplifying manufacture of the electrical energy storage device 24. Furthermore, problems associated with air pockets formed by incomplete flow of the conventional curable flowable liquid dielectric and/or shrinkage of the conventional curable flowable liquid dielectric upon curing and/or solidification, for example, may be avoided.

The dielectric material 25 is as described with respect to the dielectric material 5.

Figure 4A:
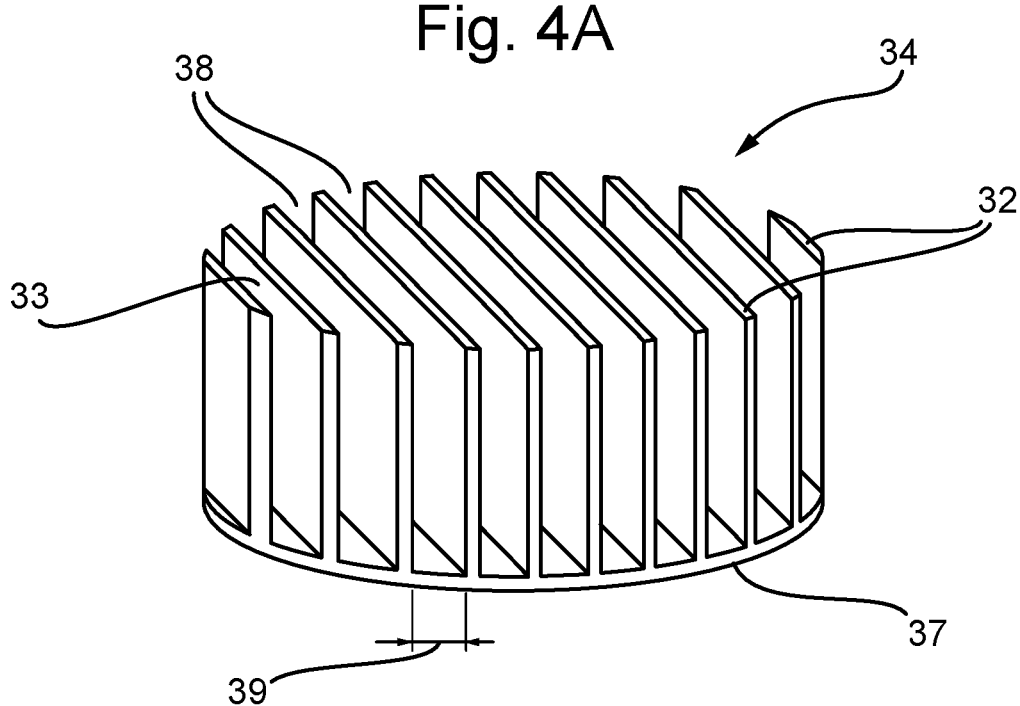
FIGS. 4A-4B schematically depict an electrical energy storage device according to an exemplary embodiment.
Figure 4B:
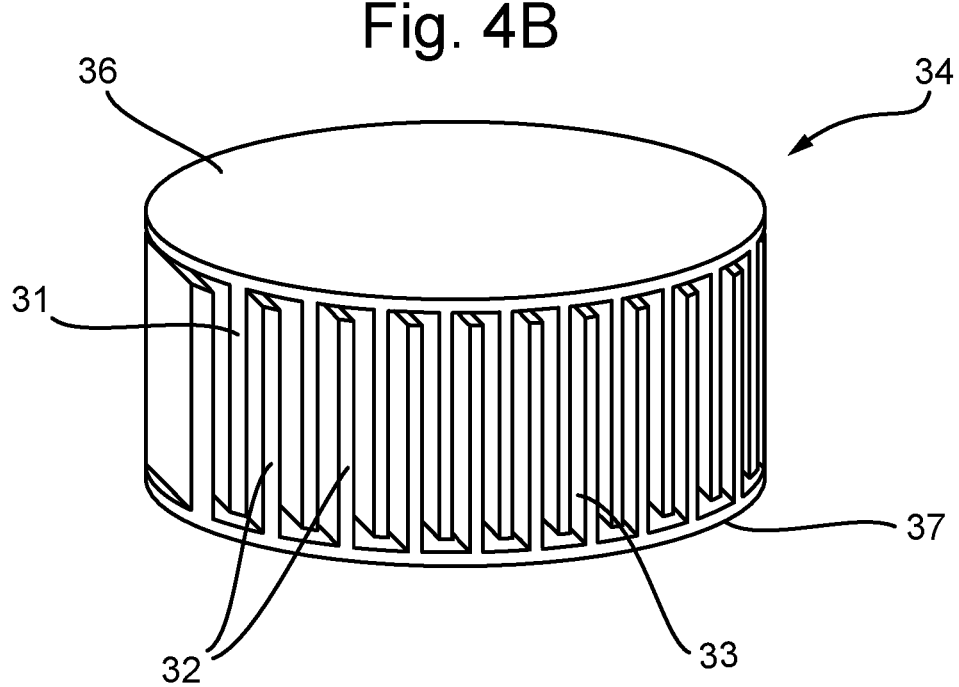

FIGS. 4A-4B schematically depict an electrical energy storage device 34 according to an exemplary embodiment.

Particularly, the electrical energy storage device 34 is formed at least in part by Fused Deposition Modelling (FDM), wherein the at least part of the electrical energy storage device 34 has a dielectric strength of at least 5 kV/mm and/or a dielectric constant of at least 5.

In more detail, the electrical energy storage device 34 is a capacitor structure 34. FIG. 4A shows a side projection of one half of the capacitor structure 34. The electrode 37 has a plurality of parallel fins 32, arranged with a gap 33 between each fin, the gap has a dimension 39 which permits the location of the corresponding protrusions 31, which are located on a second electrode 37, and the dielectric material 35 (not shown).

The outer circumference of the capacitor structure 34 has no perimeter, such that the open ends of the fins behave as slits 38, which readily permits the flow of a conventional curable flowable liquid dielectric material between the gap when the fins are mated together as shown in FIG. 4B.

FIG. 4B clearly shows the mating of the fins 31 and 32 which are the protrusions on electrodes 36 and 37, respectively.

In contrast, the electrical energy storage device 34 comprises the dielectric material 35 (not shown) formed by FDM, rather than the conventional curable flowable liquid dielectric, that has a shape to conform with the mated electrodes 37. Hence, the slits 38 are not required, thereby simplifying manufacture of the electrical energy storage device 34. Furthermore, problems associated with air pockets formed by incomplete flow of the conventional curable flowable liquid dielectric and/or shrinkage of the conventional curable flowable liquid dielectric upon curing and/or solidification, for example, may be avoided.

The dielectric material 35 is as described with respect to the dielectric material 5.

Figure 5A:
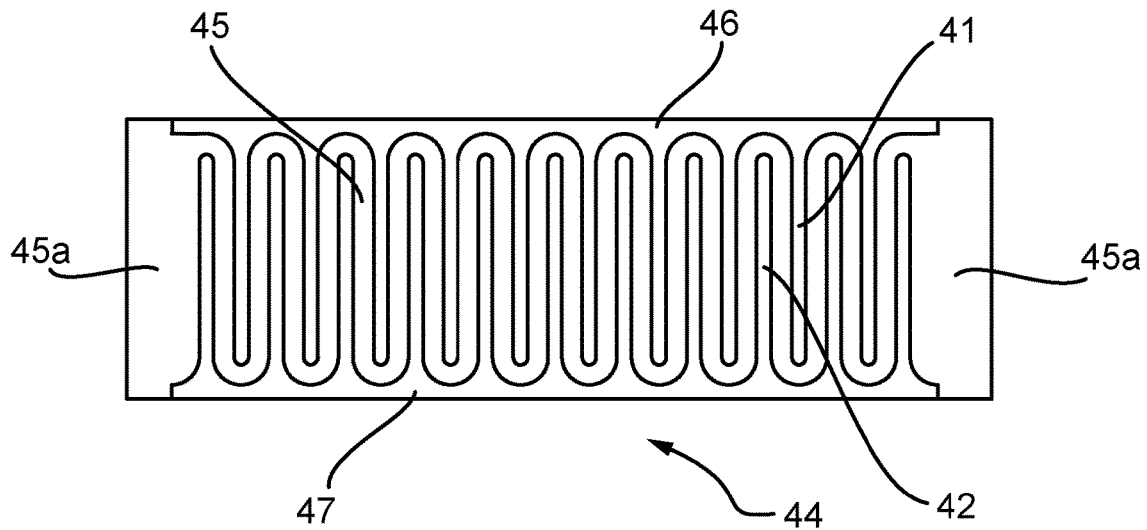
FIGS. 5A-5B schematically depict an electrical energy storage device according to an exemplary embodiment.
Figure 5B:
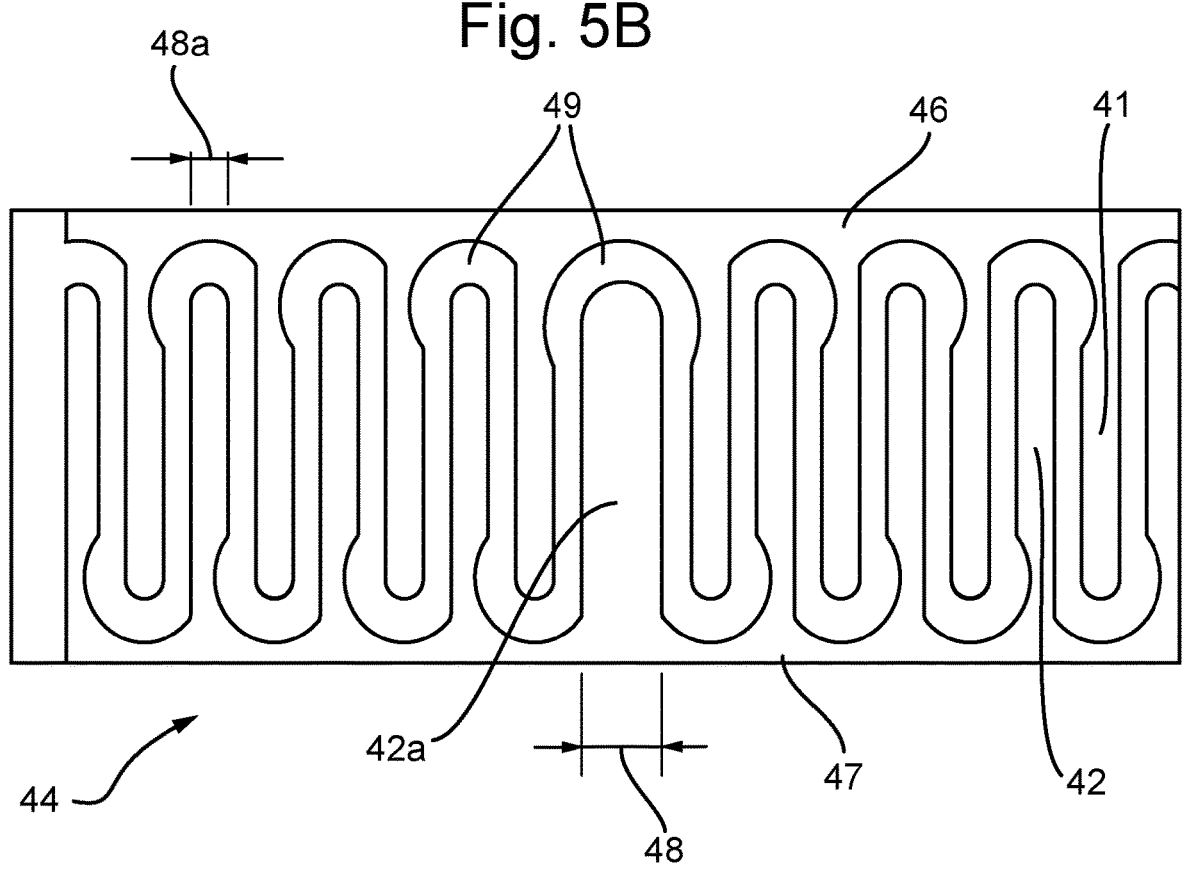

FIGS. 5A-5B schematically depict an electrical energy storage device 44 according to an exemplary embodiment.

Particularly, the electrical energy storage device 44 is formed at least in part by Fused Deposition Modelling (FDM), wherein the at least part of the electrical energy storage device 24 has a dielectric strength of at least 5 kV/mm and/or a dielectric constant of at least 5.

In more detail, the electrical energy storage device 44 is a capacitor 44. FIG. 5a shows a cross-section of a mated structure of circular protrusions as shown in FIG. 2A. The capacitor comprises circular fins 41 on a first electrode 46 with mated with circular fins 42 on a second electrode 47, (as shown in FIG. 2A), the gap between the fins 41 and 42 has been filled with a dielectric material 45. A reservoir for excess conventional curable flowable liquid dielectric material 45a is shown at the distil ends of the drawing, the excess is there to ensure that there is sufficient conventional curable flowable liquid dielectric material to flow through the structure and to ensure all conductive areas of the electrodes 46 and 47 are encapsulated to ensure there is no potential for an electrical short.

In contrast, the electrical energy storage device 44 comprises the dielectric material 45 formed by FDM, rather than the conventional curable flowable liquid dielectric, that has a shape to conform with the mated electrodes 46 and 47. Hence, the reservoir for excess conventional curable flowable liquid dielectric material 45a is not required, thereby simplifying manufacture of the electrical energy storage device 44. Furthermore, problems associated with air pockets formed by incomplete flow of the conventional curable flowable liquid dielectric and/or shrinkage of the conventional curable flowable liquid dielectric upon curing and/or solidification, for example, may be avoided.

The dielectric material 45 is as described with respect to the dielectric material 5.

FIG. 5B shows a model of the electrical fields generated in a capacitor similar to that in FIG. 5B. The capacitor has been optimised, the first electrode 46 and second electrode 47 have been provided with complex geometries. The central protrusion 42a has been designed to be of a greater thickness 48 than the thickness of the other fins 48a. A further modification has been made the protrusions 41, 42, by enlarging the radius of the rounded tips 49 of the protrusion. These modifications have reduced unwanted field enhancements.

Figure 6:
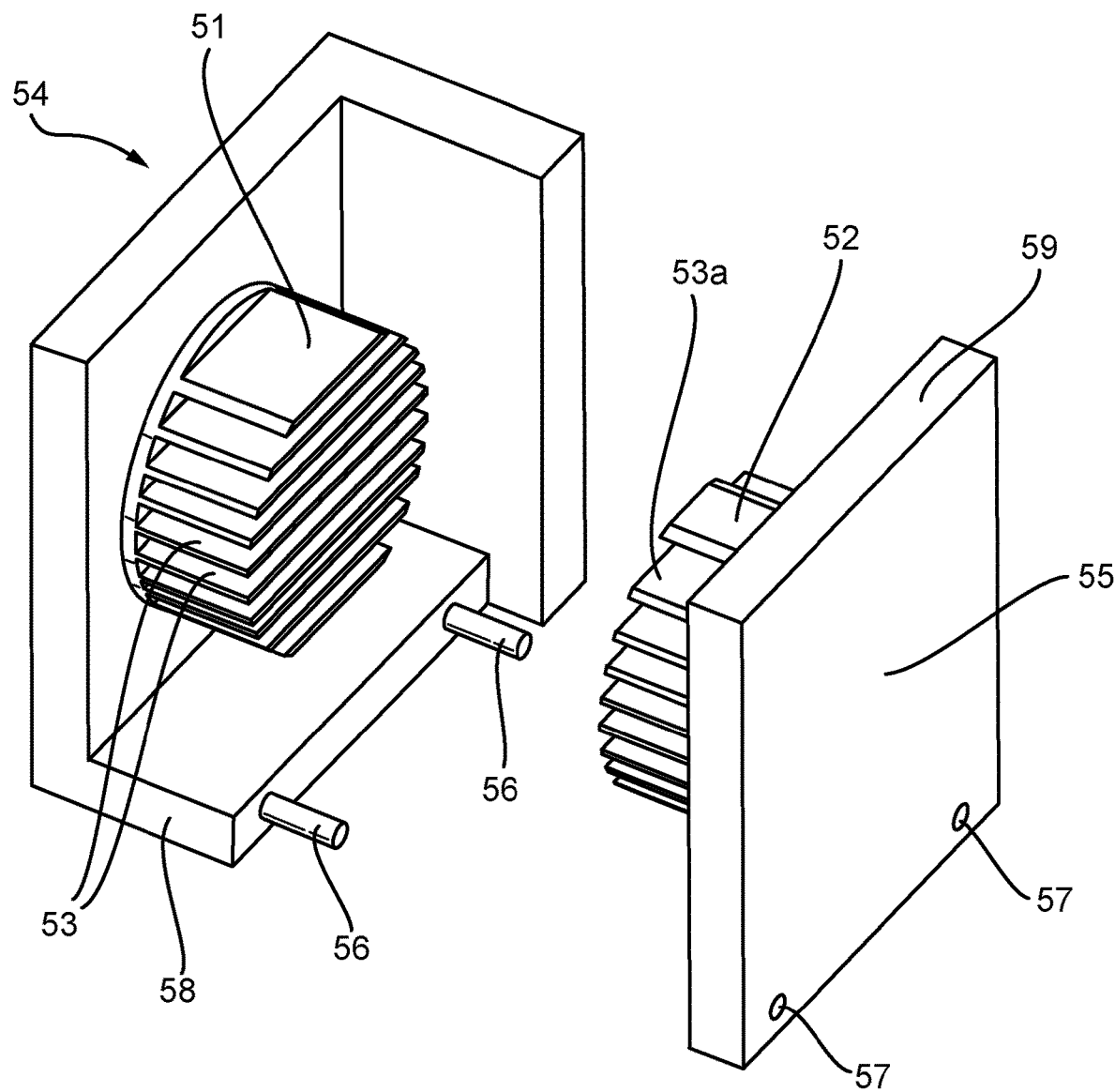
FIG. 6 schematically depicts a jig arrangement for a conventional electrical energy storage.

FIG. 6 schematically depicts a jig arrangement for a conventional electrical energy storage device, in which a conventional curable flowable liquid dielectric material is used.

Particularly, FIG. 6 shows one example of a jig arrangement 54, where the outer casing 58, 59 can be removed after construction of a capacitor. The jig 54 comprises two casing halves 58, 59 which hold the first electrode 51 and second electrode 52 respectively. The two halves 58, 59 are brought into alignment by locating lugs 56 and receiving holes 57. The thickness of the jig 59 ensures that the plurality of fins 53 and 53a engage to the correct depth. The action of the two halves 58, 59 and the thickness of jig 59 ensures that the fins 53 and 53a interlocate with a uniform spacing provided therebetween.

In contrast, by providing an electrical energy storage device comprising a dielectric material formed by FDM, rather than the conventional curable flowable liquid dielectric, such a jig arrangement 54 is not required since the dielectric material formed by FDM may determine the spacing between corresponding electrodes, thereby simplifying manufacture of the electrical energy storage device. Furthermore, problems associated with air pockets formed by incomplete flow of the conventional curable flowable liquid dielectric and/or shrinkage of the conventional curable flowable liquid dielectric upon curing and/or solidification, for example, may be avoided.

Figure 7A:
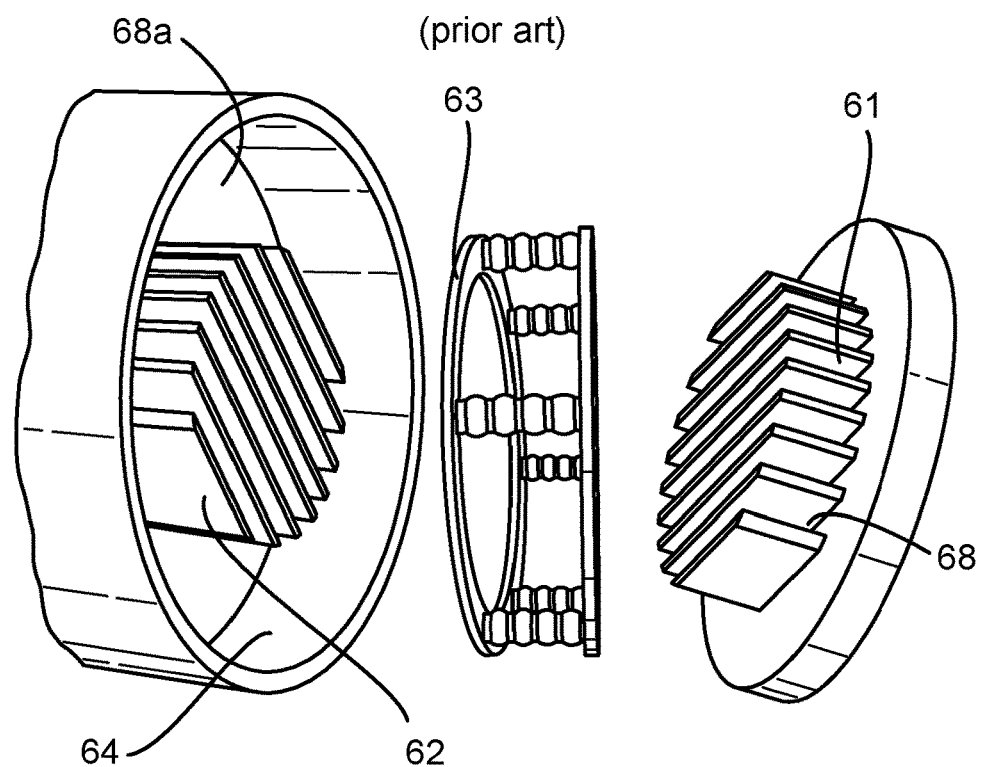
FIGS. 7A-7B schematically depict a conventional electrical energy storage device.
Figure 7B:
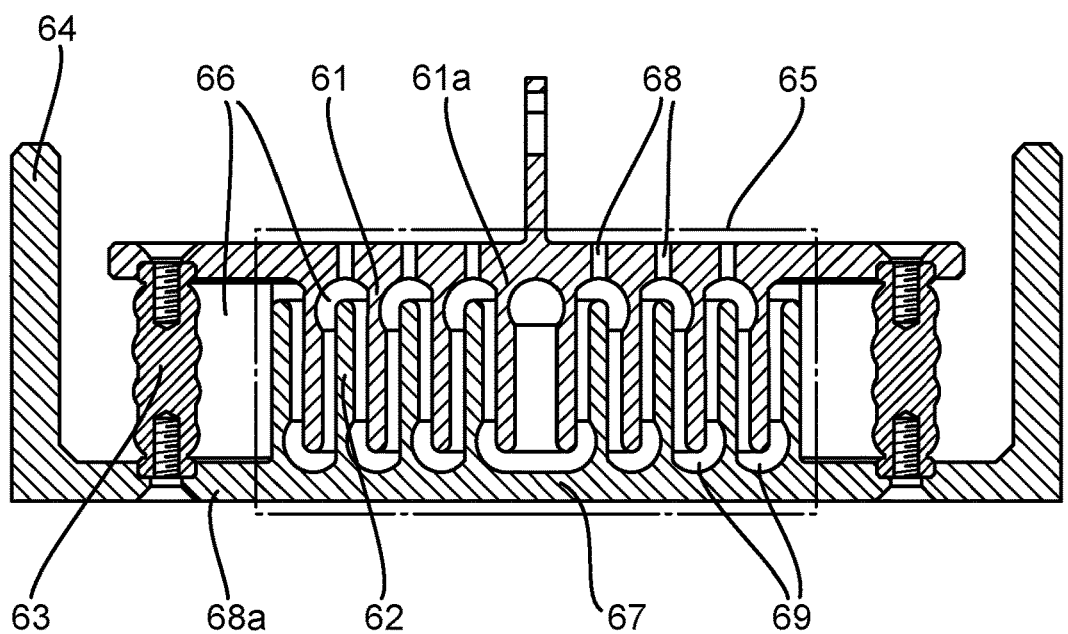

FIGS. 7A and 7B schematically depict a jig arrangement for a conventional electrical energy storage device, in which a conventional curable flowable liquid dielectric material is used.

In more detail, FIGS. 7A and 7B show a further arrangement with an integrated jig 63, which provides the correct spacings between the first electrode 61 and second electrode 62.

The first and second electrode 61, 62 have the fin type arrangement as shown in FIG. 4B.

The central protrusion 61a has been designed to be of a greater thickness than the thickness of the other fins 61. The radii of the bottom of the fins 69 have been enlarged to provide rounded tips of the fin protrusions. The second electrode 62 has an additional wall 64, so as to create a well so that the entire structure may be filled by a flowable dielectric. The gap 66 between the two electrodes is then filled by the conventional curable flowable liquid dielectric material to provide a final capacitor structure. To permit a more reproducible fill, fill holes 68 are located such that all of the gap 66 may be completely filled with dielectric material.

After the dielectric (not shown) has been cured, the area defined by box 65, is then machined away to remove the unwanted jig 63 and excess well area defined by wall 64.

In contrast, by providing an electrical energy storage device comprising a dielectric material formed by FDM, rather than the conventional curable flowable liquid dielectric, such a jig arrangement is not required since the dielectric material formed by FDM may determine the spacing between corresponding electrodes, thereby simplifying manufacture of the electrical energy storage device. For example, the dielectric material formed by FDM may have a shape to conform with the shape of the gap 66. In addition, the holes 68 are not required. Furthermore, problems associated with air pockets formed by incomplete flow of the conventional curable flowable liquid dielectric and/or shrinkage of the conventional curable flowable liquid dielectric upon curing and/or solidification, for example, may be avoided.

The dielectric material formed by FDM is as described with respect to the dielectric material 5.

Figure 8A:
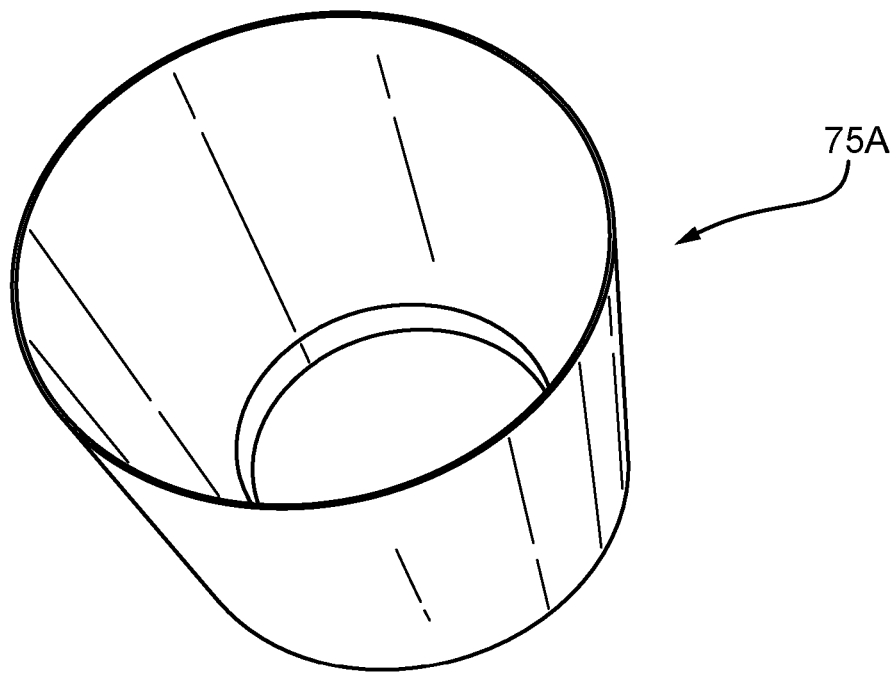
FIGS. 8A-8B schematically depict parts of an electrical energy storage device according to an exemplary embodiment.
Figure 8B:
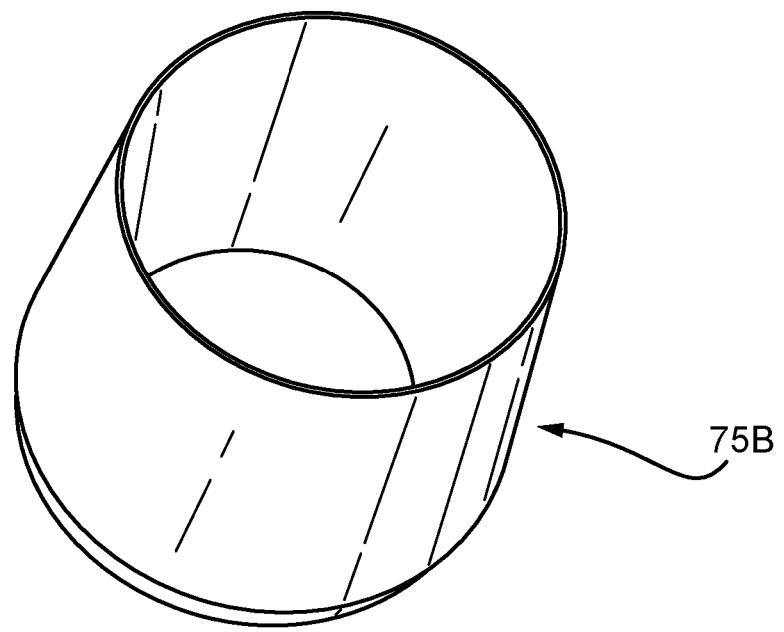

FIGS. 8A-8B schematically depict parts 75A, 75B of an electrical energy storage device according to an exemplary embodiment. Particularly, FIGS. 8A-8B respectively show photographs of the parts 75A, 75B of the electrical energy storage device formed at least in part by Fused Deposition Modelling (FDM), wherein the at least parts 75A, 75B of the electrical energy storage device have a dielectric strength of at least 5 kV/mm and/or a dielectric constant of at least 5.

In detail, the parts 75A, 75B are formed by FDM from a dielectric material as described with respect to the dielectric material 5. The part 75A is frustoconical, having a wall thickness that decreases towards the end having the larger diameter. The part 75B is frustoconical, having a wall thickness that decreases towards the end having the smaller diameter.

Figure 9:
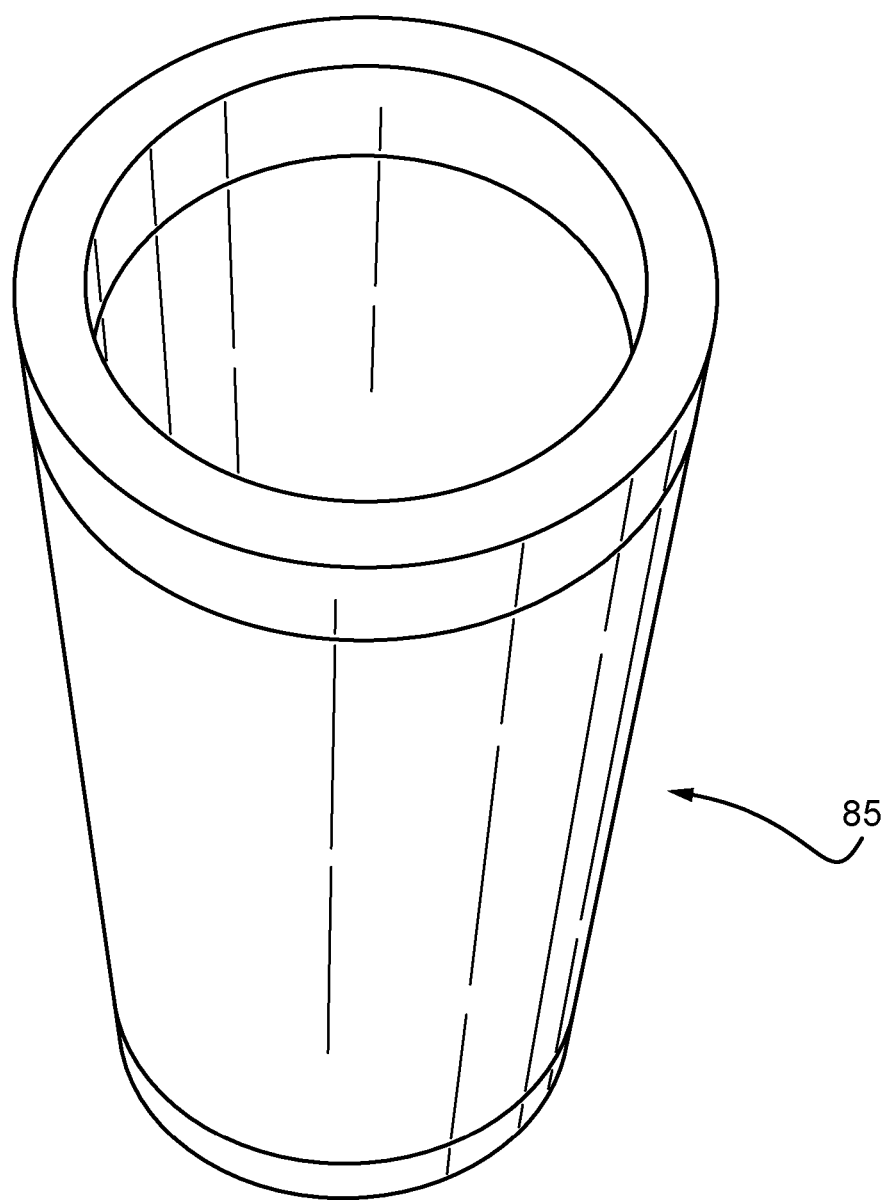
FIG. 9 schematically depicts a part of an electrical energy storage device according to an exemplary embodiment.

FIG. 9 schematically depicts a part 85 of an electrical energy storage device according to an exemplary embodiment. Particularly, FIG. 9 shows a photograph of the part 85 of the electrical energy storage device formed at least in part by Fused Deposition Modelling (FDM), wherein the at least part 85 of the electrical energy storage device has a dielectric strength of at least 5 kV/mm and/or a dielectric constant of at least 5.

In detail, the part 85 is formed by FDM from a dielectric material as described with respect to the dielectric material 5. The part 85 is a circular pipe, having constant internal and external diameters.

Figure 10:
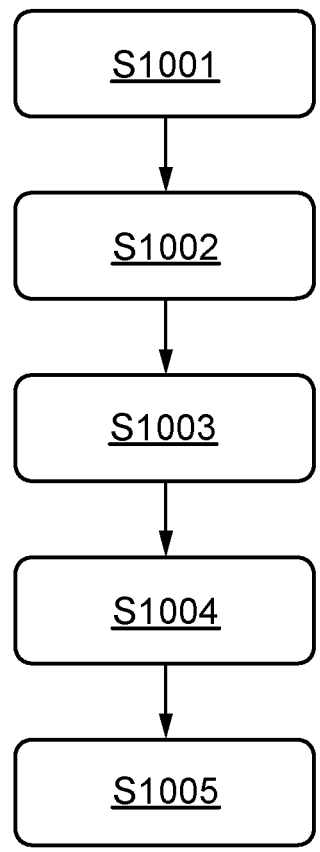
FIG. 10 schematically depicts a method according to an exemplary embodiment.

FIG. 10 schematically depicts a method according to an exemplary embodiment. Particularly, FIG. 10 schematically depicts a method of providing a material for 3D printing according to an exemplary embodiment.

At S1001, ceramic particles comprising a metal are sintered.

At S1002, the sintered particles are milled, wherein at least 50% by weight of the milled particles have a diameter in a range from 10 to 100 µm.

At S1003, the milled particles are mixed in an amount of from 50 to 99 wt. % with a polymeric composition comprising a thermoplastic polymer to provide a mixture.

At S1004, the mixture is heated, thereby melting the thermoplastic.

At S1005, the mixture is cooled, thereby providing the material, wherein the material has a dielectric strength of at least 5 kV/mm and/or a dielectric constant of at least 5.

The method may include any of the steps described herein, for example as described with respect to the third aspect. The ceramic particles, the metal, the polymeric composition comprising the thermoplastic polymer and/or the material may be as described herein, for example as described with respect to the first aspect.

Figure 11:
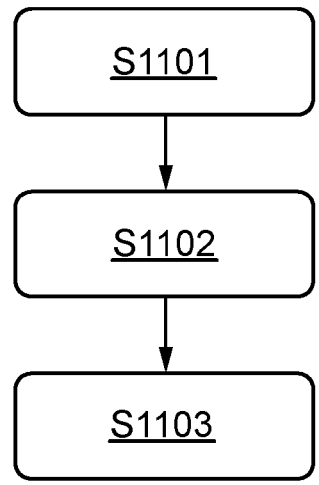
FIG. 11 schematically depicts a method according to an exemplary embodiment.

FIG. 11 schematically depicts a method according to an exemplary embodiment. Particularly, FIG. 11 schematically depicts a method of forming an electrical energy storage device at least in part by Fused Deposition Modelling (FDM) according to an exemplary embodiment.

At S1101, a filament according to the second aspect is provided.

At S1102, at least a part of the filament is melted in an oxygen-free atmosphere.

At S1103, the melted part of the filament is solidified to form at least a part of the electrical energy storage device, wherein the formed at least part of the electrical energy storage device has a dielectric strength of at least 5 kV/mm and/or a dielectric constant of at least 5.

The method may include any of the steps described herein, for example as described with respect to the fifth aspect. The filament may be as described herein, for example as described with respect to the second aspect. The ceramic particles, the metal, the polymeric composition comprising the thermoplastic polymer and/or the material may be as described herein, for example as described with respect to the first aspect.

Although a preferred embodiment has been shown and described, it will be appreciated by those skilled in the art that various changes and modifications might be made without departing from the scope of the invention, as defined in the appended claims and as described above.

In summary, the invention provides a material for 3D printing, as set forth in the appended claims. Also provided is a filament of the material, a method of providing the material, a device formed from the material, a method of forming the device and use of the material to provide a device. In this way, by providing ceramic particles in a material comprising additionally a polymeric composition comprising a thermoplastic polymer, a dielectric strength of the material may be increased compared with the ceramic material, to the dielectric strength of at least 5 kV/mm. Furthermore, by including the ceramic particles in the material in an amount of from 50 to 99 wt. %, the material may still have relatively high dielectric constant of at least 5, such that a relatively high capacitance and/or a relatively high volumetric electrical energy storage density of the material may be provided. In addition, by providing the material for 3D printing, complex electrical energy storage devices may be formed by 3D printing therefrom. In this way, relatively complex shapes of the electrical energy storage device may be provided, as formed by the FDM. By forming the electrical energy storage device at least in part by FDM, net or near-net solid shapes may be provided that may be assembled with corresponding electrodes, simplifying electrode design and/or manufacture and/or reducing or eliminating further processing steps and/or jig arrangements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A material for 3D printing comprising:
   a polymeric composition comprising a thermoplastic polymer; and
   from 50 to 99 wt. % ceramic particles comprising a metal, wherein at least 50% by weight of the particles have a diameter in a range from 10 to 100 µm;
   wherein the material has a dielectric strength of at least 5 kV/mm and/or a dielectric constant of at least 5.

2. The material according to claim 1, wherein the material has a dielectric strength of at least 8 kV/mm and/or a dielectric constant of at least 10.

3. The material according to claim 1 comprising at most 95 wt. % particles.

4. The material according to claim 1, wherein at least 50% by weight of the particles have a diameter in a range from 15 to 45 µm.

5. The material according to claim 1, wherein the particles comprise an oxide of the metal, wherein the metal is a transition metal.

6. The material according to claim 1, wherein the thermoplastic polymer is selected from a group consisting of poly(methyl methacrylate) (PMMA), acrylonitrile butadiene styrene (ABS), aliphatic or semi-aromatic polyamides, polylactic acid (polylactide) (PLA), polybenzimidazole (PBI), polycarbonate (PC), polyether sulfone (PES), polyetherimide, polyethylene (PE), polypropylene (PP), polymethylpentene (PMP) and polybutene-1 (PB-1), polystyrene (PS), polyvinyl chloride (PVC) thermoplastic polyurethane (TPU), poly(meth)acrylate, polyphenylene sulphone (PPSU), high density polyethylene HDPE, polyetherimide (PEI), polyether ether ketone (PEK, and nylon.

7. A filament for fused filament fabrication (FFF) formed from the material according to claim 1.

8. A method of providing a material for 3D printing comprising:
   sintering ceramic particles comprising a metal;
   milling the sintered particles, wherein at least 50% by weight of the milled particles have a diameter in a range from 10 to 100 μm;
   mixing the milled particles in an amount of from 50 to 99 wt. % with a polymeric composition comprising a thermoplastic polymer to provide a mixture;
   heating the mixture thereby melting the thermoplastic; and
   cooling the mixture thereby providing the material;
   wherein the material has a dielectric strength of at least 5 kV/mm and/or a dielectric constant of at least 5.

9. The method according to claim 8, comprising providing a filament of the material by extruding the mixture.

10. An electrical energy storage device formed at least in part by fused filament fabrication (FFF), wherein the at least part of the electrical energy storage device comprises the material according to claim 1.

11. A method of forming an electrical energy storage device at least in part by fused filament fabrication (FFF), the method comprising:
    providing a filament formed from the material according to claim 1;
    melting at least a part of the filament; and
    solidifying the melted part of the filament to form at least a part of the electrical energy storage device, wherein the formed at least part of the electrical energy storage device has a dielectric strength of at least 5 kV/mm and/or a dielectric constant of at least 5.

12. The method according to claim 11, wherein melting the at least a part of the filament is carried out in an oxygen-free atmosphere, and wherein the oxygen-free atmosphere comprises nitrogen, sulfur hexafluoride ($SF_6$), hydrogen ($H_2$), helium (He), and/or mixtures thereof.

13. The method according to claim 11, wherein the formed at least part of the electrical energy storage device has a porosity of at most 1% by volume of the formed at least part of the electrical energy storage device and/or wherein at most 50% by volume of pores therein have a diameter of at most 1 μm.

14. An electrical energy storage device comprising the material according to claim 1.

15. A filament comprising the material according to claim 1.

16. The method according to claim 11, wherein melting the at least a part of the filament is carried out using a heated extrusion nozzle, and solidifying the melted part of the filament to form at least a part of the electrical energy storage device occurs after extrusion of the filament from the nozzle.

17. The material according to claim 1, wherein the material has a porosity of at most 1% by volume of the material and/or wherein at most 50% by volume of pores therein have a diameter of at most 1 μm.

18. A filament material for 3D printing, the material comprising:
    a polymeric composition comprising a thermoplastic polymer; and
    from 50 to 95 wt. % ceramic particles comprising a metal, wherein at least 50% by weight of the particles have a diameter in a range from 15 to 45 μm;
    wherein the material has a dielectric strength of at least 5 kV/mm and/or a dielectric constant of at least 5.

19. The material according to claim 18, wherein the particles comprise an oxide of the metal, wherein the metal is a transition metal.

20. The material according to claim 18, wherein the material has a porosity of at most 1% by volume of the material and/or wherein at most 50% by volume of pores therein have a diameter of at most 1 μm.

* * * * *